US009320069B2

(12) United States Patent
Seo et al.

(10) Patent No.: US 9,320,069 B2
(45) Date of Patent: Apr. 19, 2016

(54) METHOD AND APPARATUS FOR PERFORMING INTER-UE DIRECT COMMUNICATION IN WIRELESS COMMUNICATION SYSTEM

(75) Inventors: Hanbyul Seo, Anyang-si (KR); Kijun Kim, Anyang-si (KR); Byounghoon Kim, Anyang-si (KR)

(73) Assignee: LG ELECTRONICS, Seoul (KR)

( * ) Notice: Subject to any disclaimer, the term of this patent is extended or adjusted under 35 U.S.C. 154(b) by 42 days.

(21) Appl. No.: 14/343,712

(22) PCT Filed: Jul. 30, 2012

(86) PCT No.: PCT/KR2012/006060
§ 371 (c)(1),
(2), (4) Date: Mar. 7, 2014

(87) PCT Pub. No.: WO2013/035981
PCT Pub. Date: Mar. 14, 2013

(65) Prior Publication Data
US 2014/0233557 A1    Aug. 21, 2014

Related U.S. Application Data

(60) Provisional application No. 61/532,516, filed on Sep. 8, 2011.

(51) Int. Cl.
*G01R 31/08* (2006.01)
*H04W 76/02* (2009.01)
*H04W 56/00* (2009.01)
(Continued)

(52) U.S. Cl.
CPC ........ *H04W 76/023* (2013.01); *H04W 52/0216* (2013.01); *H04W 52/0219* (2013.01); *H04W 56/00* (2013.01); *H04W 92/18* (2013.01)

(58) Field of Classification Search
CPC .................................................. H04W 76/023
USPC .......................................................... 370/350
See application file for complete search history.

(56) References Cited

U.S. PATENT DOCUMENTS

| 5,995,844 A | 11/1999 | Fukuda |
| 2007/0153758 A1 | 7/2007 | Kang et al. |

(Continued)

FOREIGN PATENT DOCUMENTS

WO    2011036507    3/2011

OTHER PUBLICATIONS

PCT International Application No. PCT/KR2012/006060, Written Opinion of the International Searching Authority dated Jan. 25, 2013, 16 pages.

*Primary Examiner* — Gerald Smarth
(74) *Attorney, Agent, or Firm* — Lee, Hong, Degerman, Kang & Walmey; Jonathan Kang; Michael Monaco

(57) ABSTRACT

Disclosed in the present application is a method in which a user equipment (UE) performs inter-UE direct communication in a wireless communication system. More particularly, the method includes the steps of: transmitting a request message to an eNodeB for direct communication with a UE of another party; receiving sequence information from the eNodeB for time synchronization with the UE of the other party; detecting a transmission sequence to be made from the UE of the other party, using the sequence information; and performing the inter-UE communication with the UE Of the other party.

8 Claims, 8 Drawing Sheets

(51) Int. Cl.
*H04W 52/02* (2009.01)
*H04W 92/18* (2009.01)

(56) References Cited

U.S. PATENT DOCUMENTS

| | | | |
|---|---|---|---|
| 2008/0304434 A1* | 12/2008 | Giaretta et al. | 370/313 |
| 2009/0017851 A1 | 1/2009 | Li et al. | |
| 2009/0185543 A1* | 7/2009 | Chen | H04W 48/08 370/338 |
| 2009/0327395 A1* | 12/2009 | Park et al. | 709/202 |
| 2011/0098043 A1* | 4/2011 | Yu et al. | 455/435.1 |
| 2011/0176483 A1* | 7/2011 | Palanki et al. | 370/328 |
| 2011/0182280 A1* | 7/2011 | Charbit et al. | 370/350 |
| 2012/0106372 A1* | 5/2012 | Gaal et al. | 370/252 |
| 2012/0113825 A1* | 5/2012 | Baglin | H04W 24/00 370/252 |
| 2012/0115518 A1* | 5/2012 | Zeira | H04W 8/005 455/500 |

* cited by examiner

FIG. 2
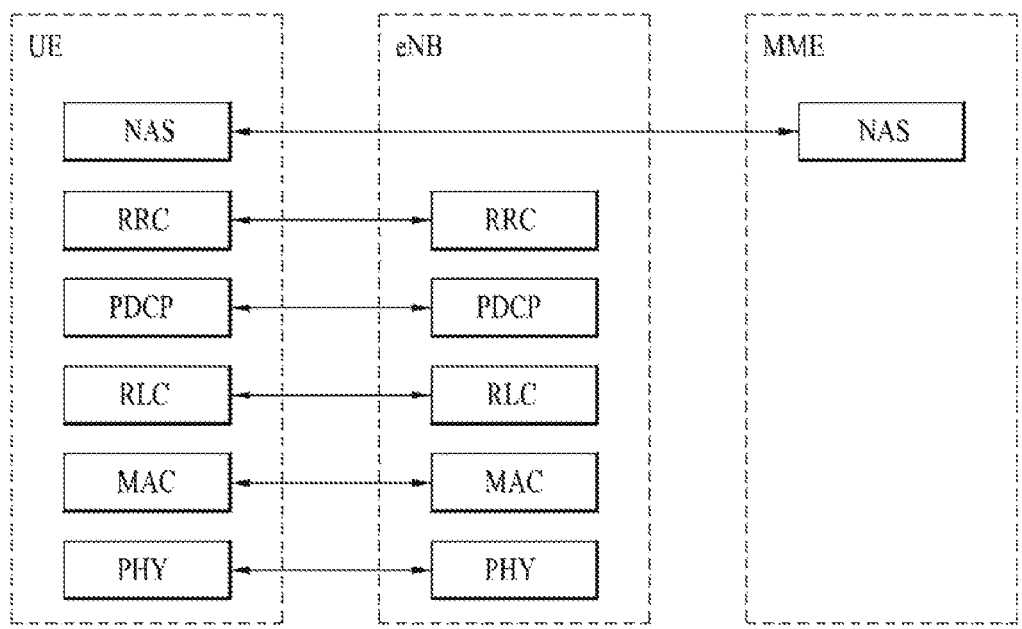
(a) Control-Plane Protocol Stack
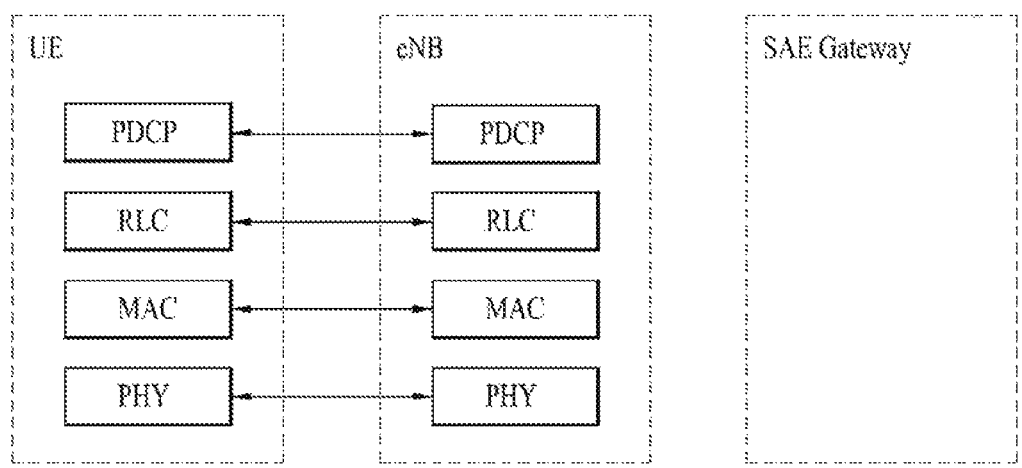
(b) User-Plane Protocol Stack

METHOD AND APPARATUS FOR PERFORMING INTER-UE DIRECT COMMUNICATION IN WIRELESS COMMUNICATION SYSTEM

CROSS-REFERENCE TO RELATED APPLICATIONS

This application is the National Stage filing under 35 U.S.C. 371 of International Application No. PCT/KR2012/006060, filed on Jul. 30, 2012, which claims the benefit of U.S. Provisional Application Ser. No. 61/532,516, filed on Sep. 8, 2011, the contents of which are all hereby incorporated by reference herein in their entirety.

FIELD OF THE INVENTION

The present invention relates to a wireless communication system and, most particularly, to a method and apparatus for performing inter-UE direct communication in a wireless communication system.

BACKGROUND ART

As an example of a communication system to which the present invention may be applied, a 3GPP LTE ($3^{rd}$ Generation Partnership Project Long Term Evolution; hereinafter referred to as "LTE") communication system will now be broadly described.

FIG. 1 illustrates a general view of an E-UMTS network structure as an example of a communication system. Herein, the E-UMTS (Evolved Universal Mobile Telecommunications System) corresponds to a system evolved from the conventional UMTS (Universal Mobile Telecommunications System). The 3GPP is presently carrying out a basic standardization process for the E-UMTS. Generally, the E-UMTS may also be referred to as an LTE system. For details of the technical specifications of the UMTS and the E-UMTS, reference may be made to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG), which is located at an end of a network (E-UTRAN) and connected to an external network. The base stations can simultaneously transmit multiple data streams for a broadcast service, a multicast service and/or a unicast service.

One or more cells may exist for one base station. One cell is set to one of bandwidths of 1.44, 3, 5, 10, 15, and 20 Mhz to provide a downlink or uplink transport service to several user equipments. Different cells may be set to provide different bandwidths. Also, one base station controls data transmission and reception for a plurality of user equipments. The base station transmits Downlink (DL) scheduling information of downlink data to the corresponding user equipment to notify information related to time and frequency domains to which data will be transmitted, encoding, data size, and HARQ (Hybrid Automatic Repeat and reQuest). Also, the base station transmits Uplink (UL) scheduling information of uplink data to the corresponding user equipment to notify information related to time and frequency domains that can be used by the corresponding user equipment, encoding, data size, and HARQ. An interface for transmitting user traffic or control traffic can be used between the base stations. A Core Network (CN) may include the AG and a network node or the like for user registration of the UE. The AG manages mobility of a UE on a TA (Tracking Area) unit basis, wherein one TA unit includes a plurality of cells.

The wireless communication technology has been developed up to the LTE based upon WCDMA. However, the demands and expectations of the users and the manufacturers and providers are growing continuously. Also, since other wireless access technologies are constantly being developed, the wireless communication technology is required to newly evolve in order to ensure competiveness in the future. Accordingly, characteristics, such as reduced cost for each bit, extended service availability, usage of a flexible frequency band, simple structure and open interface, and adequate power consumption of the user equipment are being requested.

DETAILED DESCRIPTION OF THE INVENTION

Technical Objects

Based upon the above-described discussion, a method and apparatus for performing inter-UE direct communication in a wireless communication system will hereinafter be proposed.

Technical Solutions

In an aspect of the present invention, a method for performing inter-user equipment (UE) direct communication of a user equipment in a wireless communication system includes the steps of transmitting a message requesting for direct communication with a counterpart user equipment (or user equipment of another party) to a base station; receiving sequence information for time synchronization with the counterpart user equipment from the base station; detecting a sequence being transmitted from the counterpart user equipment by using the received sequence information; and performing inter-UE direct communication with the counterpart user equipment.

Herein, the base station may be different from a counterpart base station performing communication with the counterpart user equipment. Accordingly, the base station and the counterpart base station may exchange the sequence information between one another through a backhaul link.

Preferably, the step of detecting a sequence may include detecting the sequence during a threshold time period; and, in case the sequence is not detected during the threshold time period, determining that the inter-UE direction communication has failed and transmitting the determined result to the base station. In this case, the sequence information may include information on the threshold time period.

Meanwhile, in another aspect of the present invention, as a user equipment (UE) configured to perform inter-UE direct communication in a wireless communication system, the user equipment includes a transmitting module configured to transmit a message requesting for direct communication with a counterpart user equipment to a base station; a receiving module configured to receive sequence information for time synchronization with the counterpart user equipment from the base station; and a processor configured to detect a sequence being transmitted from the counterpart user equipment by using the received sequence information, and, herein, the processor may be configured to control the transmitting module and the receiving module, so as to perform inter-UE direct communication with the counterpart user equipment.

Effects of the Invention

According to the exemplary embodiment of the present invention, a method and apparatus for performing inter-UE direct communication in a wireless communication system may be efficiently provided.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application.

BRIEF DESCRIPTION OF THE DRAWINGS

FIG. 2 illustrates a Control Plane structure and a User Plane structure of a Radio Interface Protocol between a user equipment and the E-UTRAN based upon the 3GPP radio access network standard.

MODE FOR CARRYING OUT THE PRESENT INVENTION

Figure 1:
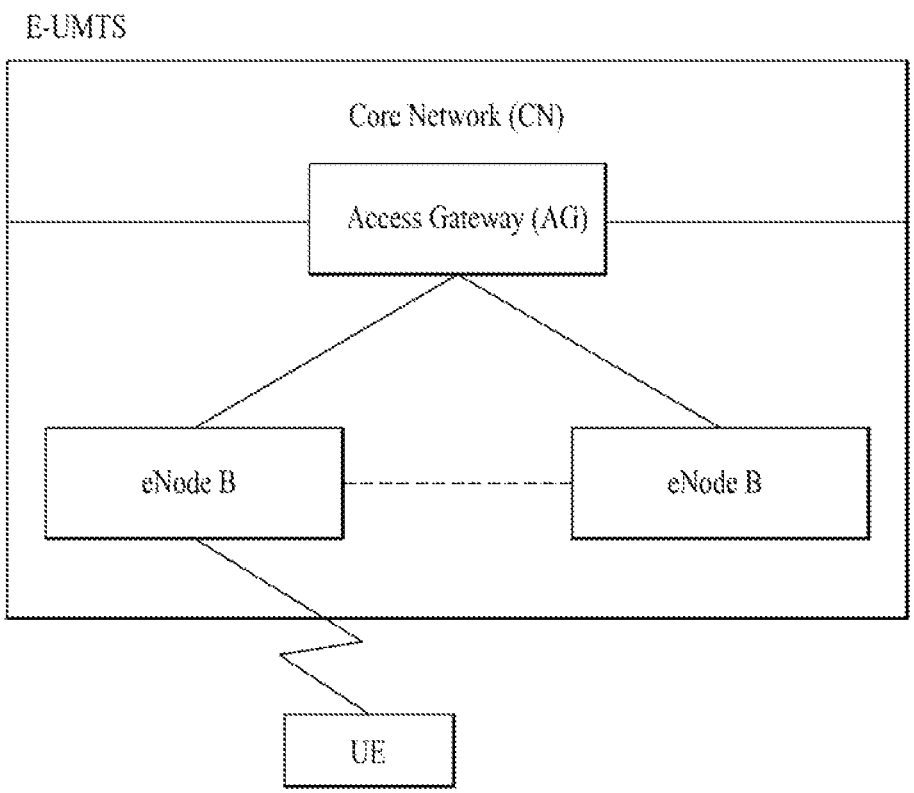
FIG. 1 illustrates a general view of an E-UMTS network structure as an example of a wireless communication system.

Hereinafter, reference will now be made in detail to the preferred embodiments of the present invention, examples of which are illustrated in the accompanying drawings. The detailed description of the present invention is provided to facilitate the understanding of the configuration, operation, and other characteristics of the present invention. The following embodiments of the present invention correspond to examples wherein the technical features of the present invention are applied in the 3GPP system.

The description of the present invention will describe the embodiments of the present invention by using the LTE system and the LTE-A system. However, this is merely exemplary, and, therefore, the present invention may be applied to any other corresponding to the above-described definition. Also, the description of the present invention will also describe the embodiments of the present invention based upon an FDD method. However, this is also merely exemplary, and, therefore, the present invention may also be easily modified and applied to an H-FDD method or a TDD method.

FIG. 2 illustrates a Control Plane structure and a User Plane structure of a Radio Interface Protocol between a user equipment and the E-UTRAN based upon the 3GPP radio access network standard. A control plane refers to a path through which control messages are transmitted. Herein, the control messages are used by the User Equipment (UE) and network in order to manage a unit. And, a user plane refers to a path through which data generated from an application layer are transmitted. Such data may include audio data or Internet packet data, and so on.

A first layer, which corresponds to a physical layer, uses a physical channel to provide an Information Transfer Service to a higher layer. The physical layer is connected to a Medium Access Control layer, which corresponds to a higher layer, through a Transport Channel. And, herein, data is transported between the Medium Access Control layer and the physical layer through the Transport Channel (TransAntenna port Channel). In a data transmission between a physical layer of the transmitting end and a physical layer of the receiving end, data are transported between the physical layers through a physical channel. Herein, the physical layer uses time and frequency as radio resource. More specifically, in a downlink, the physical channel is modulated by using an OFDMA (Orthogonal Frequency Division Multiple Access) scheme, and, in an uplink, the physical channel is modulated by using an SC-FDMA (Single Carrier Frequency Division Multiple Access) scheme.

A Medium Access Control (MAC) layer of a second layer provides services to a Radio Link Control (RLC) layer, which corresponds to higher layer, through a logical channel. The Radio Link Control (RLC) layer of the second layer supports the transmission of reliable data. The function of the RLC layer may also be realized by a functional block within the MAC. A PDCP (Packet Data Convergence Protocol) layer of the second layer performs a header compression function, which can reduce unnecessary control information in order to efficiently transmit IP packets, such as IPv4 or IPv6, in a wireless (or radio) interface having a narrow bandwidth.

A radio resource control (RRC) layer which is positioned in a lowermost portion of a third layer is defined only in the control plane. And, in relation with the configuration, re-configuration, and release of radio bearers (RBs), the RRC layer performs the role of controlling the logical channels, the transmission channels, and the physical channels. The Radio Bearer refers to a service that is provided by the second layer in order to deliver (or transport) data between the UE and the network. In order to do so, the RRC layers of the UE and the network exchanges RRC messages to and from one another. If an RRC connection exists between the RRC layer of the UE and the RRC layer of the network, the user equipment is in an RRC Connected Mode. And, if not, the user equipment is in an RRC Idle Mode. An NAS (Non-Access Stratum) layer, which is located above the RRC layer performs the roles of Session Management and Mobility Management.

One cell that configures a base station (eNB) is set to one of bandwidths of 1.4, 3, 5, 10, 15, and 20 Mhz, thereby providing a downlink or uplink transport service to several user equipments. Different cells may be set to provide different bandwidths.

In the network, downlink transmission channels that transmit data to the UE include a BCH (Broadcast Channel), which transmits system information, a PCH (Paging Channel), which transmits paging messages, and a downlink SCH (Shared Channel), which transmits information other than the system information, such as user traffic or control messages. In case of traffic information or control messages of a downlink multicast or broadcast service, the corresponding data may be transmitted through a downlink SCH or may also be transmitted through a separate downlink MCH (Multicast Channel). Meanwhile, uplink transmission channels that transmit data from the UE to the network include a RACH (Random Access Channel), which transmits initial control messages, and an uplink SCH (Shared Channel), which transmits information other than the system information, such as user traffic or control messages. Logical Channels being in a level higher than the transmission channel and being mapped to the transmission channel include a BCCH (Broadcast Channel), a PCCH (Paging Control Channel), a CCCH (Common Control Channel), an MCCH (Multicast Control Channel), an MTCH (Multicast Traffic Channel), and so on.

Figure 3:
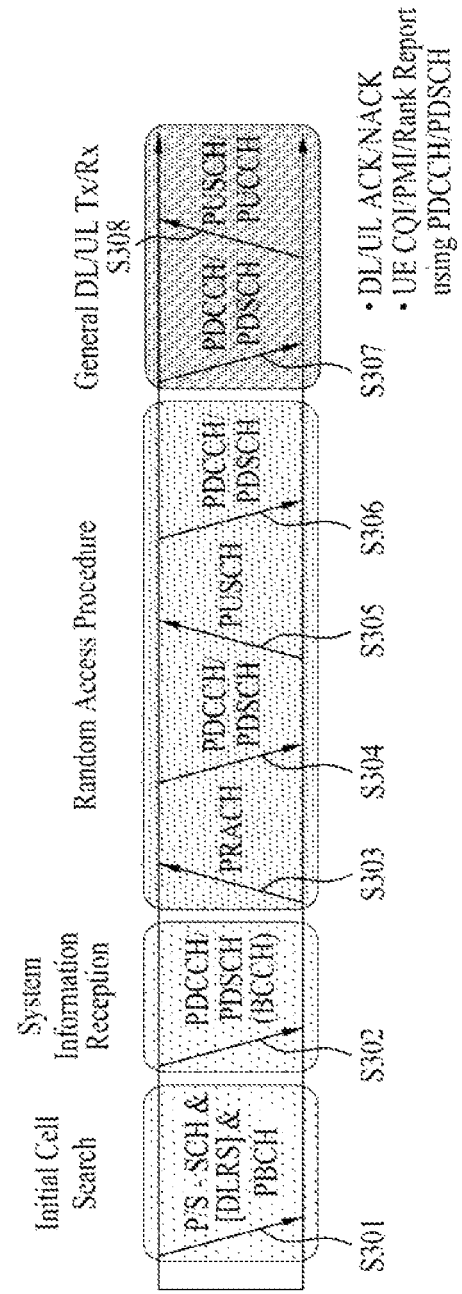
FIG. 3 illustrates physical channels that are used in the 3GPP system and a general method for transmitting signals using such physical channels.

FIG. 3 illustrates physical channels that are used in the 3GPP system and a general method for transmitting signals using such physical channels.

The user equipment performs initial cell search such as synchronization with the base station, when it newly enters a cell or when the power is turned on (S301). In order to do so, the user equipment establishes synchronization with the base station by receiving a Primary Synchronization Channel (P-SCH) and a Secondary Synchronization Channel (S-SCH) from the base station, and then acquires information such as cell ID, and so on. Thereafter, the user equipment may acquire broadcast information within the cell by receiving a Physical Broadcast Channel from the base station. Meanwhile, in the step of initial cell search, the user equipment may receive a Downlink Reference Signal (DL RS) so as to verify the downlink channel status.

Once the user equipment has completed the initial cell search, the corresponding user equipment may acquire more detailed system information by receiving a Physical Downlink Control Channel (PDCCH) and a Physical Downlink Control Channel (PDSCH) based upon the respective information carried in the PDCCH (S302).

Meanwhile, if the user equipment initially accesses the base station, or if there are no radio resources for signal transmission, the user equipment may perform a Random Access Procedure (RACH) with respect to the base station (S303 to S306). In order to do so, the user equipment may transmit a specific sequence to a preamble through a Physical Random Access Channel (PRACH) (S303 and S305), and may receive a response message respective to the preamble through the PDCCH and the PDSCH corresponding to the PDCCH (S304 and S306). In case of a contention based RACH, a Contention Resolution Procedure may be additionally performed.

After performing the above-described process steps, the user equipment may perform PDCCH/PDSCH reception (S307) and Physical Uplink Shared Channel (PUSCH)/Physical Uplink Control Channel (PUCCH) transmission (S308), as general uplink/downlink signal transmission procedures. Most particularly, the user equipment receives Downlink Control Information (DCI) through the PDCCH. Herein, the DCI includes control information, such as resource allocation information respective to the UE, and the format of the DCI may vary depending upon the purpose for using the DCI.

Meanwhile, the control information, which is transmitted by the user equipment to the base station or received by the user equipment from the base station via uplink, includes downlink/uplink ACK/NACK signals, a CQI (Channel Quality Indicator), a PMI (Precoding Matrix Index), an RI (Rank Indicator), and so on. In case of the 3GPP LTE system, the user equipment may transmit control information, such as the above-described CQI/PMI/RI through the PUSCH and/or the PUCCH.

Figure 4:
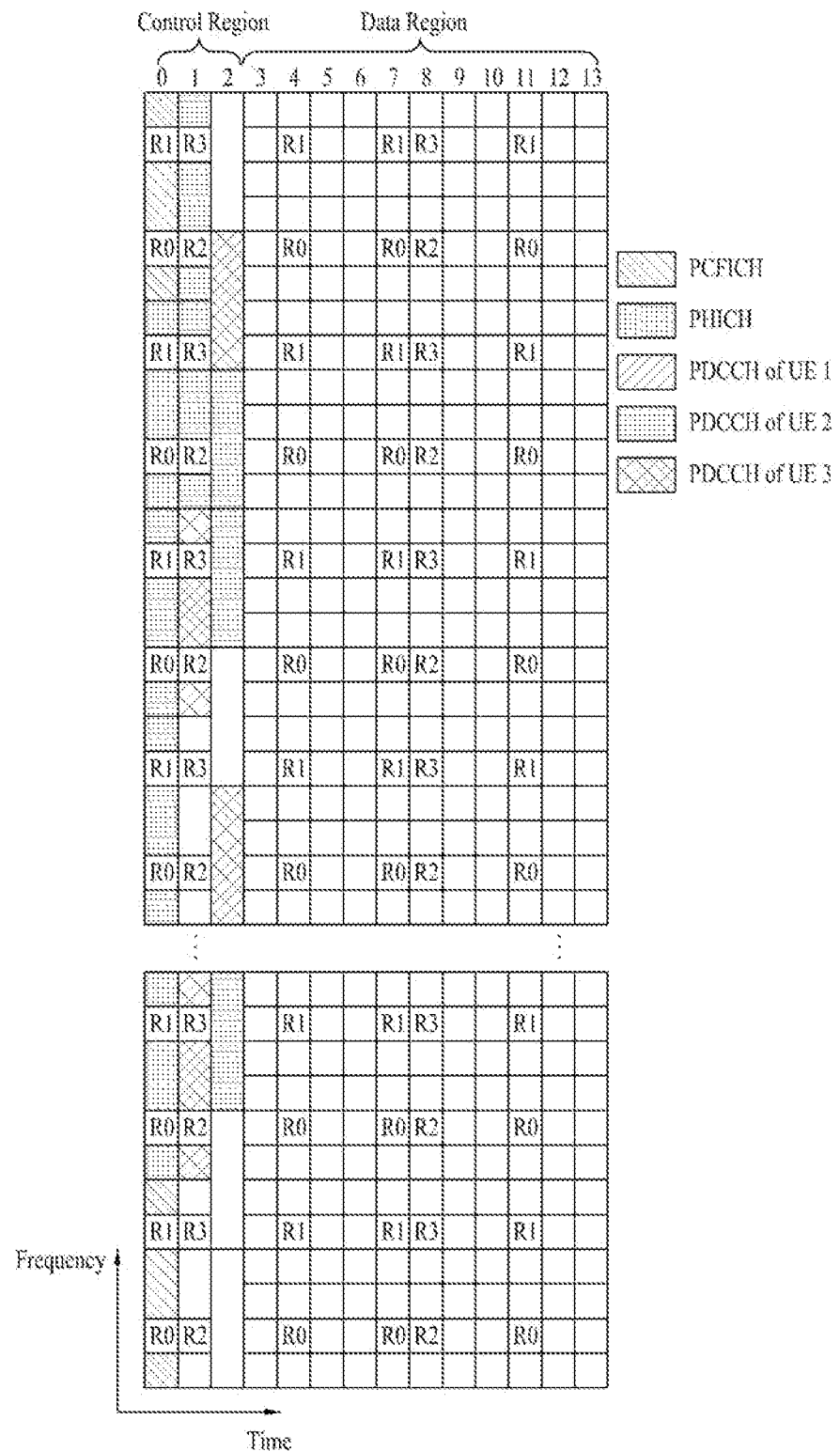
FIG. 4 illustrates an exemplary structure of a downlink radio frame that is used in the LTE system.

FIG. 4 illustrates an exemplary structure of a downlink radio frame that is used in the LTE system.

Referring to FIG. 4, one subframe is configured of 14 OFDM symbols. Depending upon the subframe settings, the first one to three OFDM symbols are used as the control region, and the remaining 13-11 OFDM symbols are used as the data region. Referring to the drawing, R1 to R4 respectively represent Reference Signals (RSs) or Pilot Signals for antennas 0 to 3. Regardless of the control region and the data region, the RS is fixed within the subframe according to a consistent pattern. A control channel is allocated to resources of the control region to which the RS is not allocated. And, a traffic channel is allocated to resources of the data region to which the RS is not allocated. Control channels that are allocated to the control region may include a PCFICH (Physical Control Format Indicator CHannel), a PHICH (Physical Hybrid-ARQ Indicator CHannel), a PDCCH (Physical Downlink Control CHannel), and so on.

As a Physical Control Format Indicator Channel, the PCFICH notifies the user equipment of the number of OFDM symbols used in the PDCCH for each subframe. The PCFICH is located in the first OFDM symbol and is configured at a higher priority level than the PHICH and the PDCCH. The PCFICH is configured of 4 REGs (Resource Element Groups), and each REG is distributed (or spread) within the control region based upon the Cell ID (Cell Identity). One REG is configured of 4 REs (Resource Elements). An RE represents a minimum physical resource defined by one sub-carrier×one OFDM symbol. The PCFICH value indicates a value ranging from 1 to 3 or from 2 to 4 depending upon the bandwidth and is modulated by using QPSK (Quadrature Phase Shift Keying).

As a Physical HARQ (Hybrid-Automatic Repeat and request) Indicator Channel, the PHICH is used for delivering HARQ ACK/NACK respective to uplink transmission. More specifically, the PHICH represents a channel through which DL ACK/NACK information for UL HARQ is transmitted. The PHICH consists of one REG and is cell-specifically scrambled. An ACK/NACK is indicated by 1 bit and is modulated by using BPSK (Binary phase shift keying). The modulated ACK/NACK is distributed (or spread) by a Spreading Factor (SF)=2 or 4. A plurality of PHICH being mapped to the same resource configures a PHICH group. The number of PHICHs being multiplexed in the PHICH group is decided in accordance with the number of spreading codes. The PHICH (group) is repeated 3 times in order to obtain diversity gain in the frequency domain and/or the time domain.

As a Physical Downlink Control Channel, the PDCCH is allocated to the first n number of OFDM symbols of a subframe. Herein, n is an integer equal to or greater than 1, and n is designated by the PCFICH. The PDCCH is configured of one or more CCEs (Control Channel Elements). The PDCCH notifies each user equipment or a user equipment group of information associated to resource allocation of a PCH (Paging Channel) and a DL-SCH (Downlink-shared channel), Uplink Scheduling Grant, HARQ information, and so on. The PCH (Paging Channel) and the DL-SCH (Downlink-shared channel) are transmitted through the PDSCH. Therefore, with the exception for specific control information or specific service data, the base station and the user equipment generally transmit and receive data through the PDSCH.

Information on the user equipment (one user equipment or a plurality of user equipments) to which the data of the PDSCH are to be transmitted, and information on how the user equipments receive and decode the transmitted PDSCH data are included in the PDCCH and transmitted. For example, it is assumed that a specific PDCCH is processed with CRC masking with an RNTI (Radio Network Temporary Identity) "A", and it is also assumed that information on the data being transmitted by using a radio resource (e.g., frequency position) "B" and a transmission format information (e.g., transmission block size, modulation method, coding information, etc.) "C" are transmitted through a specific subframe. In this case, a user equipment within a cell uses its own RNTI so as to monitor the PDCCH. And, when one or more user equipments carries RNTI "A", the corresponding user equipments receive the PDCCH and then receive the PDSCH, which is indicated by "B" and "C", through the received PDCCH information.

Figure 5:
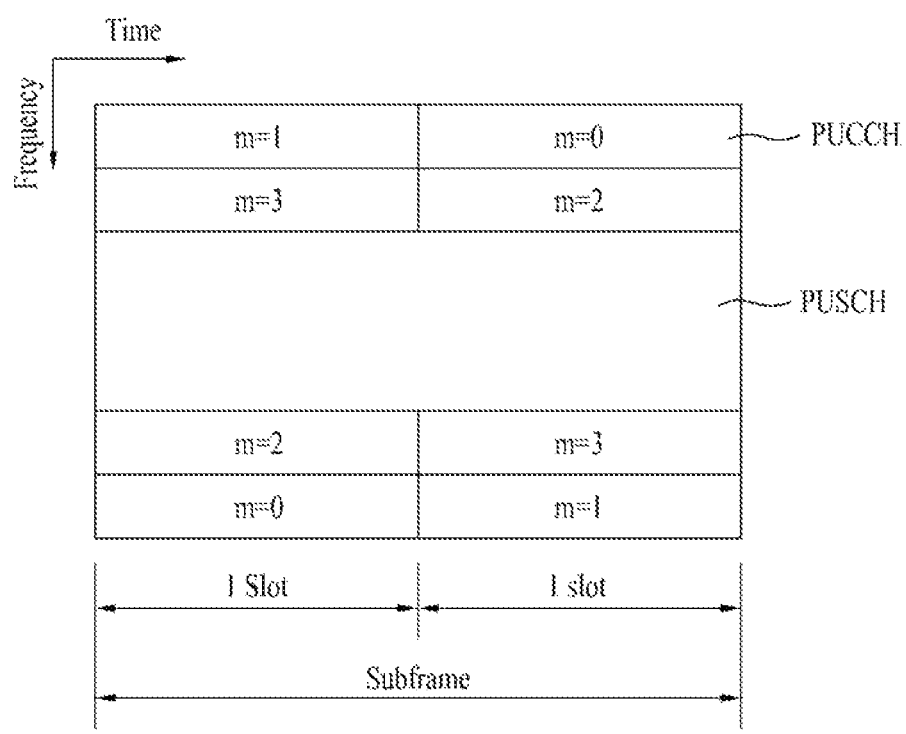
FIG. 5 illustrates an exemplary structure of an uplink radio frame that is used in the LTE system.

FIG. 5 illustrates an exemplary structure of an uplink subframe that is used in the LTE system.

Referring to FIG. 5, an uplink subframe may be divided into a region having a PUCCH (Physical Uplink Control CHannel) carrying control information allocated thereto, and a region having a PUSCH (Physical Uplink Shared CHannel) carrying user data allocated thereto. A middle portion of the subframe is allocated to the PUSCH, and both end portions of the data region within the frequency domain are allocated to the PUCCH. The control information that is transmitted over the PUCCH includes an ACK/NACK being used for the HARQ, a CQI (Channel Quality Indicator) indicating a downlink channel status, an RI (Rank Indicator) for MIMO, an SR (Scheduling Request) corresponding to an uplink resource allocation request, and so on. The PUCCH for one user equipment uses one resource block, which occupies a different frequency for each slot within the subframe. More specifically, 2 resource blocks being allocated to the PUCCH are frequency hopped at a slot boundary. Most particularly, FIG. 6 shows an example of a PUCCH wherein m=0, a PUCCH wherein m=1, a PUCCH wherein m=2, and a PUCCH wherein m=3 are allocated to the subframe.

The present invention proposes a user equipment (UE) to user equipment (UE) communication method, wherein user equipments (UEs) perform direct communication between one another without passing through the base station.

Figure 6:
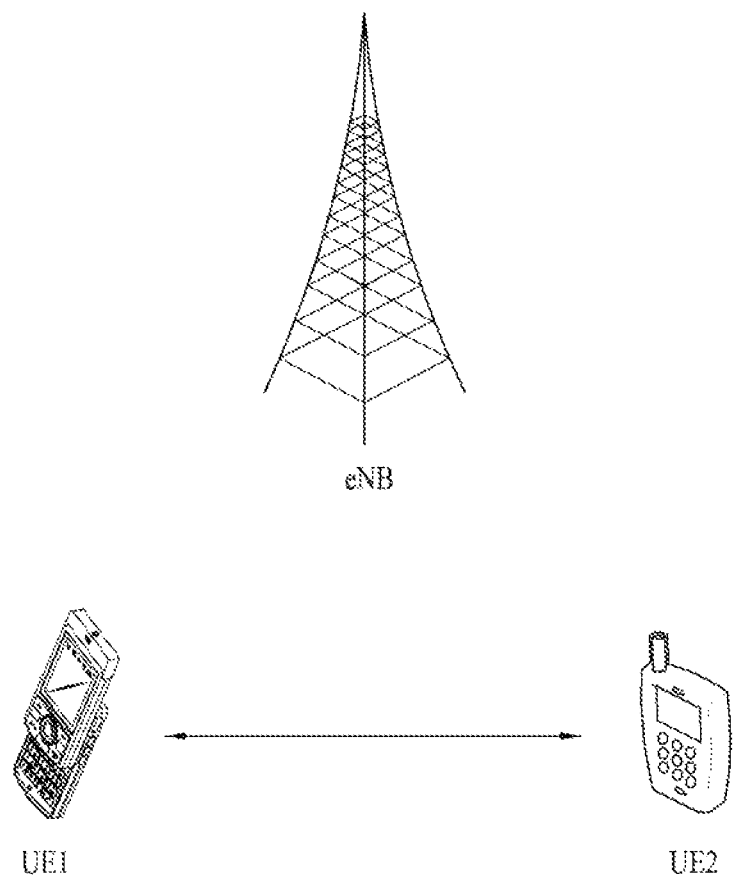
FIG. 6 illustrates a conceptual view of a UE to UE (inter-UE) communication method.

FIG. 6 illustrates a conceptual view of a UE to UE (inter-UE) communication method.

Referring to FIG. 6, as compared to the conventional base station based communication method, wherein one user equipment transmits a signal to the base station, and wherein the base station transmits the received signal to another user equipment, the UE to UE communication method, i.e., the inter-UE direct communication is advantageous in that latency is decreased, thereby reducing the consumption of radio resources.

In FIG. 6, it is shown that two user equipments are controlled by a single eNB. However, the present invention will not be limited only to this, and two user equipments performing inter-UE direct communication may each be controlled by a difference eNB. Most particularly, in case two user equipments are each controlled by a different eNB, the inter-UE direct communication may be performed based upon an information exchange between the eNBs, which may be realized by a method that will be described later on.

In the present invention, a user equipment that intends to perform inter-UE direct communication (or a user equipment capable of performing the same) first notifies the eNB of such intentions (or capability) and enlists itself on a UE list as a potential peer of the inter-UE direct communication. The eNB or its higher layer collects such information and maintains/manages an identifier (ID) of the user equipment, which is likely to be a peer of the inter-UE direct communication, and its location information.

When a situation requiring inter-UE direct communication actually occurs (e.g., when an application requiring inter-UE direct communication is operated, or when a situation having data likely to perform inter-UE direct communication generated and stored in a buffer occurs), the user equipment notifies this fact to the eNB. Herein, a case when user equipment 1 attempts to perform inter-UE direct communication with user equipment 2 is being introduced.

When user equipment 1 notifies the eNB of its intentions to perform inter-UE direct communication with user equipment 2, the eNB first searches the position information of the user equipment and determines whether or not user equipment 2 exists within a region wherein inter-UE direct communication can be performed with user equipment 1. If user equipment 2 exists in a region where inter-UE direct communication with user equipment 1 cannot be performed (e.g., when it is determined that user equipment 2 is located in a very remote cell), the network directs user equipment 1 not to attempt inter-UE direct communication with user equipment 2. And, upon receiving such directions, user equipment 1 may stop all series of procedures, such as searching for user equipment 2, and so on, so as to prevent unnecessary power consumption from occurring. When the network determines whether or not inter-UE direct communication can be performed, information exchange may be performed between the network and the eNB. For example, in case the range of cell managed by each eNB is not very large, user equipment may be capable of performing inter-UE direct communication within user equipment 2, which is located in a cell of another neighboring eNB.

Accordingly, when an eNB (eNB 1) receives a request to perform inter-UE direct communication with user equipment 2 from user equipment 1, and when user equipment 2 does not exist in the cell of eNB 1, the eNB may transmit a message requesting for information on user equipment to other neighboring eNBs via backhaul link. Among the neighboring eNBs that have received the message requesting for the information on user equipment 2, the eNB (eNB 2) including user equipment 2 in its cell may respond to the received message indicating that user equipment 2 exists in its region, and eNB 2 may also transmit additional information (e.g., receiving power of each eNB reference signal most recently reported by user equipment 2 and, most particularly, reference signal measurement value of an eNB cell having user equipment 1 located therein, which is useful for estimating a distance between the eNB cell and user equipment 1, and so on) that can be useful for determining location information of user equipment 2, and so on, along with the response.

Whenever required, eNB 1 may decide whether or not to establish inter-UE direct communication between user equipment 1 and user equipment 2 based upon the information provided by the neighboring eNB 2. In the above-described example, it shall be assumed that user equipment 1 is already located within close range of eNB 2, which includes user equipment 2 in its cell.

Additionally, when eNB 1 transmits a message to eNB 2 indicating that user equipment 1 wishes to perform inter-UE direct communication with user equipment 2, information between user equipment 1 and eNB 2 (e.g., reference signal receiving power of eNB 2 from user equipment 1) may also be transmitted, and, based upon the current status of user equipment 2 (e.g., reference signal receiving power of eNB 1), eNB 2 may determine whether or not inter-UE direct communication can be performed and may notify the determined result.

If user equipment 2 is in an idle mode, whether or not the user equipment belongs to a specific eNB becomes unclear. In this case, the eNB may request a device supervising the location information of each user equipment, such as a location management server or MME (mobility management entity), for the current location information of user equipment 2, and the entity having received such request may direct a paging message to be transmitted to a paging region, in which user equipment 2 belongs, so that user equipment 2 can be operated to access a neighboring eNB. By performing this procedure, when the location information of user equipment 2 is determined, this may be notified to the eNB including user equipment 1.

Meanwhile, when it is determined that inter-UE direct communication can be performed, the eNB may first direct a detection sequence, such as an RACH preamble, which allows the two user equipments to detect one another and to establish synchronization between one another, to be transmitted. It will be preferable that this detection sequence in transmitted in a format of repeatedly transmitting a specific pattern within a time/frequency domain (or region). The eNB may notify each user equipment of information on the detection sequence (e.g., sequence generating seed, sequence transmission resource and cycle period, and so on), which is used by counterpart user equipments (or user equipments of other parties) when detecting the corresponding user equipment. Additionally, the eNB also notifies detection sequence information of the counterpart user equipment, so that the corresponding user equipment can detect the counterpart user equipment. If user equipments each belonging to a different eNB perform inter-UE direct communication, one eNB may exchange information on detection sequence with another eNB via backhaul link. Herein, the information on detection sequence may include subframe timing information for timing synchronization, information on which eNB is using the corresponding sequence, information on the number of transmission sessions, information on the transmission time, and so on. Additionally, when user equipments each belonging to a different eNB perform inter-UE direct communication, in order to establish timing synchronization, each user equipment should be aware of an identifier of a cell in which its peer user equipment, i.e., counterpart user equipment, belongs. And, such information may also be notified by each eNB to the corresponding user equipment.

Most particularly, a detection sequence information exchange message between such eNBs may include information on a detection sequence that is being used (or that can be used in a later process) by each eNB. And, when the inter-UE direct communication is terminated in order to appropriately manage an available detection sequence of each eNB, this is notified to a neighboring eNB, thereby being capable of indicating which detection sequence is no longer being used.

When a detection sequence of a counterpart user equipment is detected, the user equipment reports such detection to the eNB. After receiving this report, the eNB may determine that synchronization between two user equipments has been acquired (or established), and, then, the eNB may direct data to be exchanged via inter-UE link.

Figure 7:
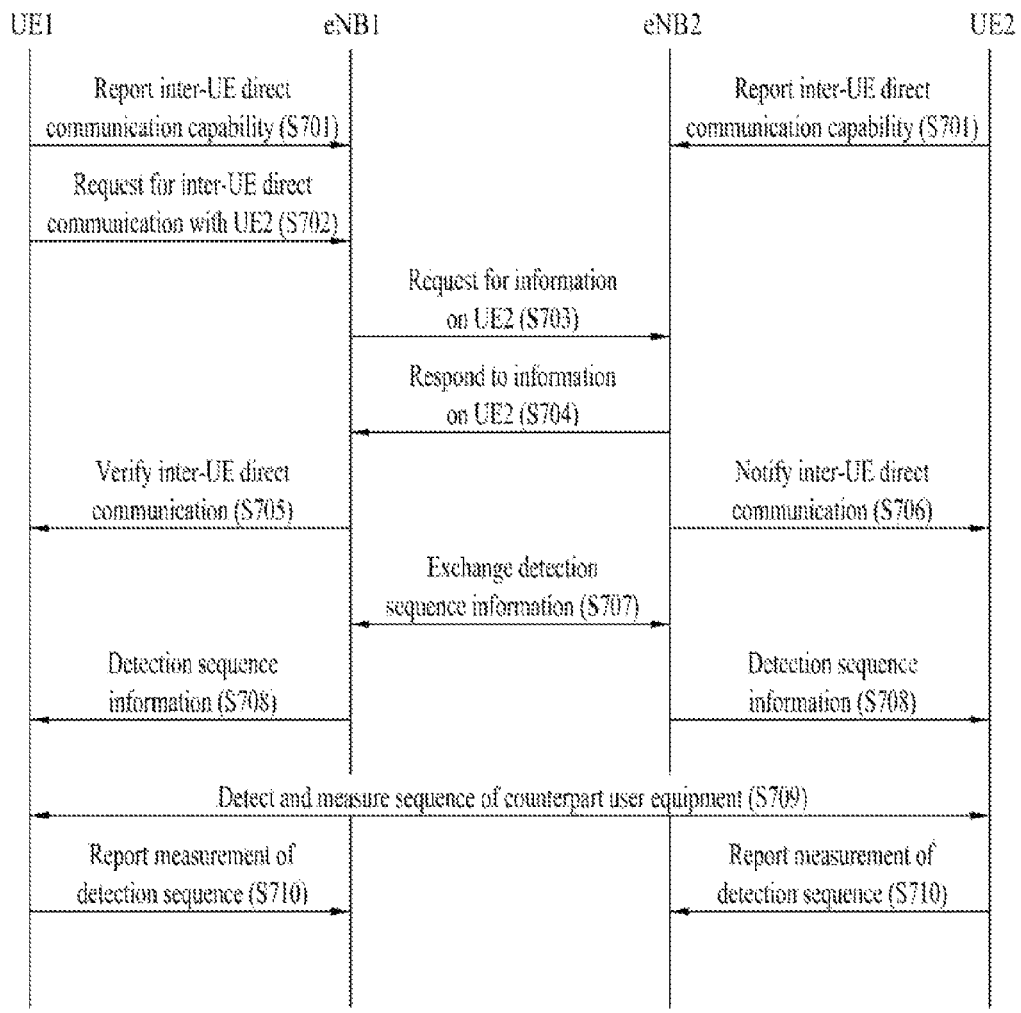
FIG. 7 illustrates an example of performing inter-UE direct communication according to an exemplary embodiment of the present invention.

FIG. 7 illustrates an example of performing inter-UE direct communication according to an exemplary embodiment of the present invention. Most particularly, in FIG. 7, it is assumed that user equipment 1 belongs to eNB 1 and that user equipment 2 belongs to eNB 2.

Referring to FIG. 7, in step 701, each user equipment reports its capability to perform inter-UE direct communication to the eNB to which the respective user equipment belongs. More specifically, user equipment 1 may report its capability to perform inter-UE direct communication to eNB 1, and user equipment 2 may report its capability to perform inter-UE direct communication to eNB 2. Herein, the capability to perform inter-UE direct communication may refer to information on whether or not a function for performing inter-UE direct communication is realized in the corresponding user equipment.

Thereafter, in step 702, user equipment 1 transmits a message requesting to perform inter-UE direct communication within user equipment 2. After receiving the request message, in step 703, eNB 1 requests eNB 2 for information on user equipment 2, and, in step 704, eNB 2 transmits a message including information on user equipment 2 to eNB 1. Herein, the communication between eNB 1 and eNB 2 may be realized via backhaul link.

Furthermore, in step 705, as a response to the inter-UE direct communication request message, eNB 1 may transmit a message for verifying inter-UE direct communication to user equipment 1. Also, in step 706, in order to notify that user equipment 1 has requested for inter-UE direct communication to user equipment 2, eNB 2 may transmit an inter-UE direct communication notification message.

Afterwards, in the present invention, as shown in step 707, a procedure for exchanging information on a detection sequence for the inter-UE direct communication between user equipment 1 and user equipment 2 may be realized, and, as shown in step 708, each of eNB 1 and eNB 2 may signal information on the detection sequence to user equipment 1 and user equipment 2.

After receiving the signal information, as shown in step 709, user equipment 1 and user equipment 2 perform a procedure for detecting a sequence of a counterpart user equipment and for measuring the detected sequence. Finally, in step 710, user equipment 1 and user equipment 2 may perform a procedure of reporting a measurement result of the detected sequence to the respective eNB and may, then, finalize the preparation procedure of performing inter-UE direct communication.

In accordance with the above-described procedure, user equipment 1 and user equipment 2 may attempt to detect a detection sequence of the counterpart user equipment in accordance with the directions of each of eNB 1 and eNB 2. However, due to reasons of the counterpart user equipment being located in a remote region or in a shadow area, user equipment 1 and user equipment 2 may not be capable of appropriately detecting the detection sequence. At this point, in case the user equipment continuously attempts to perform detection, a delay may occur in the data transmission and waste in power may simultaneously occur with respect to the detection attempt. In order to prevent this, the eNB may set up a predetermined time limit, so that the eNB can be operated to no longer attempt any further detection, in case a specific user equipment cannot detect a detection sequence of a counterpart user equipment within the corresponding time period.

Similarly, by setting up a maximum transmission cycle period of the detection sequence, in case a specific user equipment cannot detect a data transmission/reception signal for the inter-UE direct communication, which is transmitted from the counterpart user equipment (or in case a specific user equipment cannot detect a data transmission/reception control signal for the inter-UE direct communication, which is transmitted from the eNB) within the corresponding time period, the eNB may be operated to no longer continue the inter-UE direct communication and to stop the detection sequence transmission in order to prevent excessive waste of power.

Figure 8:
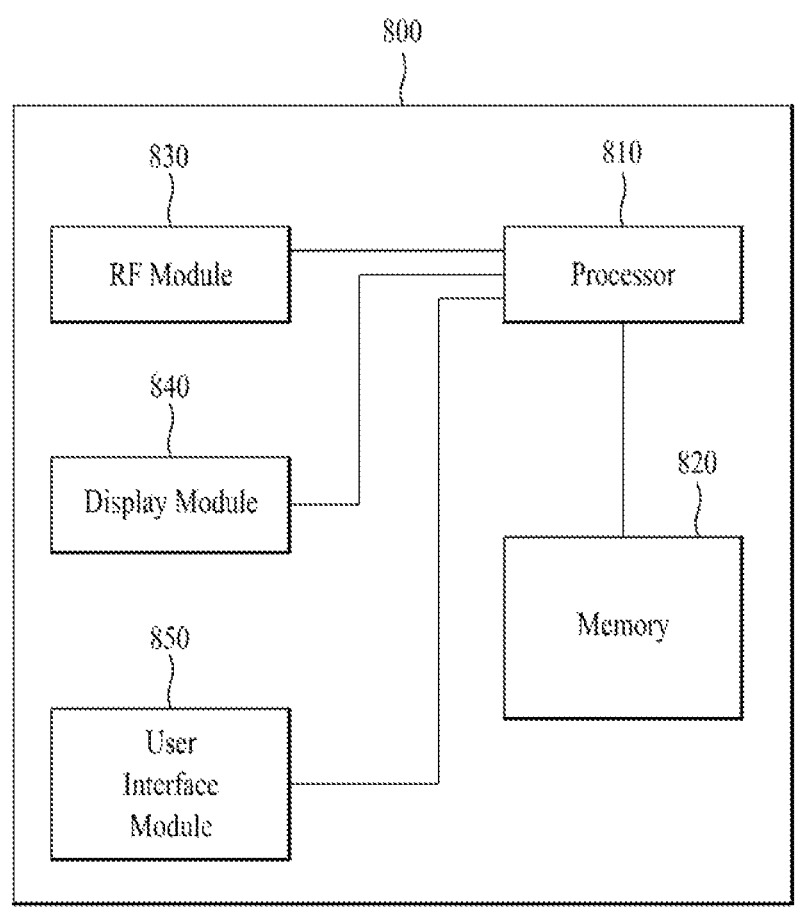
FIG. 8 illustrates a block view showing the structures of a communication device according to an exemplary embodiment of the present invention.

FIG. 8 illustrates a block view showing the structure of a communication device according to an exemplary embodiment of the present invention.

Referring to FIG. 8, a communication device (800) includes a processor (810), a memory (820), an RF module (830), a display module (840), and a user interface module (850).

The communication device (800) is an exemplary illustration provided to simplify the description of the present invention. Also, the communication device (800) may further include necessary modules. Also, in the communication device (800), some of the modules may be divided into more segmented modules. Referring to FIG. 8, an example of the processor (810) is configured to perform operations according to the embodiment of the present invention. More specifically, reference may be made to the description of FIG. 1 to FIG. 7 for the detailed operations of the processor (810).

The memory (820) is connected to the processor (810) and stores operating systems, applications, program codes, data, and so on. The RF module (830) is connected to the processor (810) and performs a function of converting baseband signals to radio (or wireless) signals or converting radio signals to baseband signals. In order to do so, the RF module (830) performs analog conversion, amplification, filtering, and frequency uplink conversion or inverse processes of the same. The display module (840) is connected to the processor (810) and displays diverse information. The display module (840) will not be limited only to the example given herein. In other words, generally known elements, such as LCD (Liquid Crystal Display), LED (Light Emitting Diode), OLED (Organic Light Emitting Diode) may also be used as the display module (840). The user interface module (850) is connected to the processor (810), and the user interface module (850) may be configured of a combination of generally known user interfaces, such as keypads, touchscreens, and so on.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

As described above, the method and apparatus for performing inter-UE direct communication in a wireless communication system have been described based upon an example that may be applied to a 3GPP LTE system. However, in addition to the 3GPP LTE system, the exemplary embodiment of the present invention may also be applied to diverse wireless communication systems.

What is claimed is:

1. A method for performing inter-user equipment (UE) direct communication of a user equipment in a wireless communication system, the method comprising:
   transmitting, by the UE to a base station, a message requesting for direct communication with a counterpart user equipment that is in communication with a counterpart base station different from the base station;
   receiving, by the UE from the base station, sequence information provided to the base station by the counterpart base station, the sequence information for time synchronization between the UE and the counterpart user equipment;
   detecting, by the UE based on the received sequence information, a sequence being transmitted from the counterpart user equipment during a threshold time period provided by one of the base station or the counterpart base station; and
   performing, by the UE, inter-UE direct communication with the counterpart user equipment upon detecting the sequence within the threshold time period.

2. The method of claim 1, wherein the base station and the counterpart base station exchange the sequence information between one another through a backhaul link.

3. The method of claim 1, wherein
   in case the sequence is not detected during the threshold time period, determining that the inter-UE direction communication has failed and transmitting the determined result to the base station.

4. The method of claim 1, wherein the sequence information includes information on the threshold time period.

5. A user equipment (UE) configured to perform inter-UE direct communication in a wireless communication system, the user equipment comprising:

a transmitting module configured to transmit a message to a base station requesting for direct communication with a counterpart user equipment that is in communication with a counterpart base station different from the base station;

a receiving module configured to receive from the base station sequence information provided to the base station by the counterpart base station, the sequence information for time synchronization between the UE and the counterpart user equipment; and a processor configured to detect, based on the received sequence information, a sequence being transmitted from the counterpart user equipment during a threshold time period provided by one of the base station or the counterpart base station, wherein the processor is configured to control the transmitting module and the receiving module, so as to perform inter-UE direct communication with the counterpart user equipment upon detecting the sequence within the threshold time period.

6. The user equipment of claim 5, wherein the base station and the counterpart base station exchange the sequence information between one another through a backhaul link.

7. The user equipment of claim 5, wherein the processor is configured to determine that the inter-UE direction communication has failed and to transmit the determined result to the base station, in case the sequence is not detected during the threshold time period.

8. The user equipment of claim 5, wherein the sequence information includes information on the threshold time period.

* * * * *